Patented Sept. 8, 1931

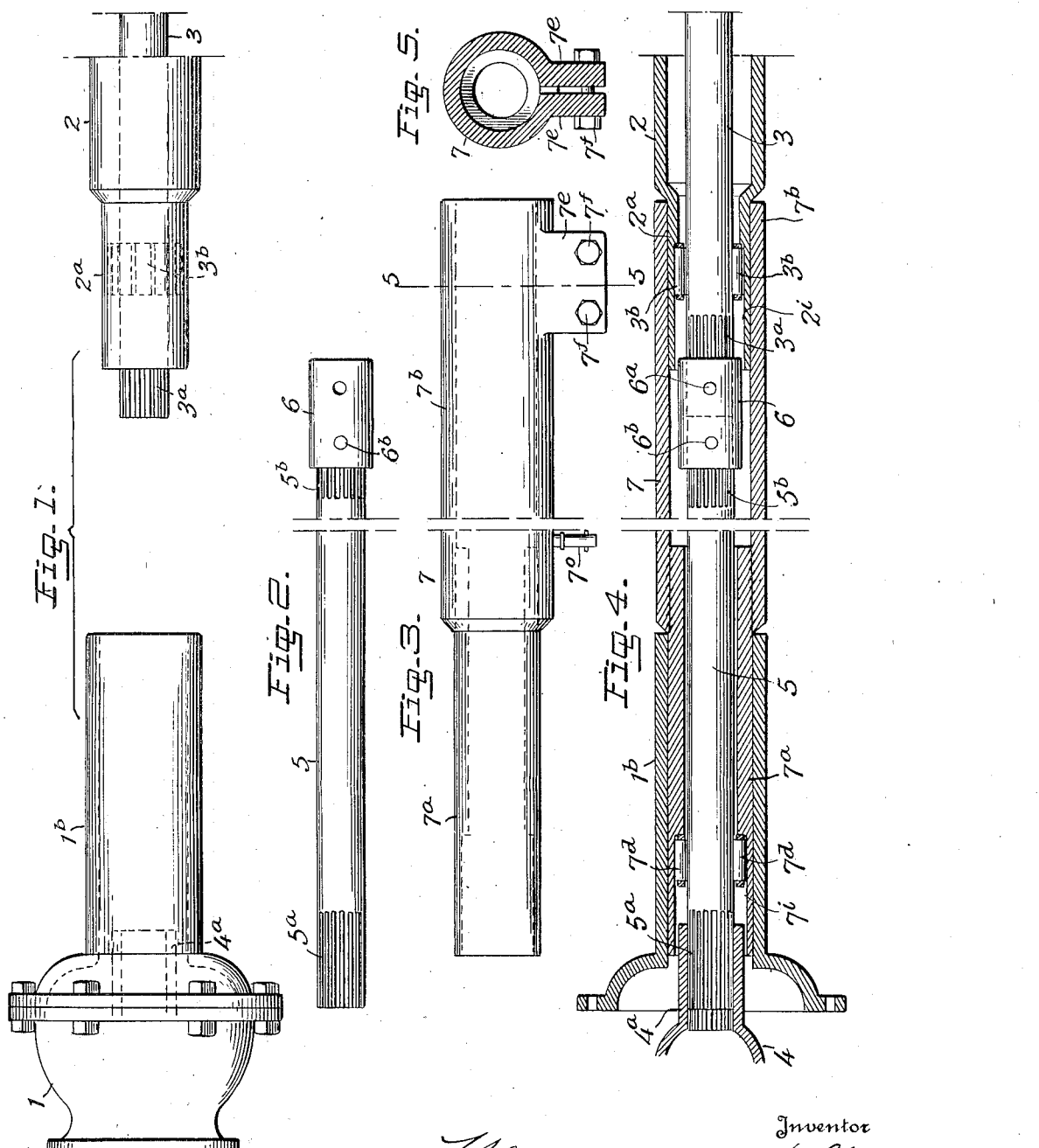

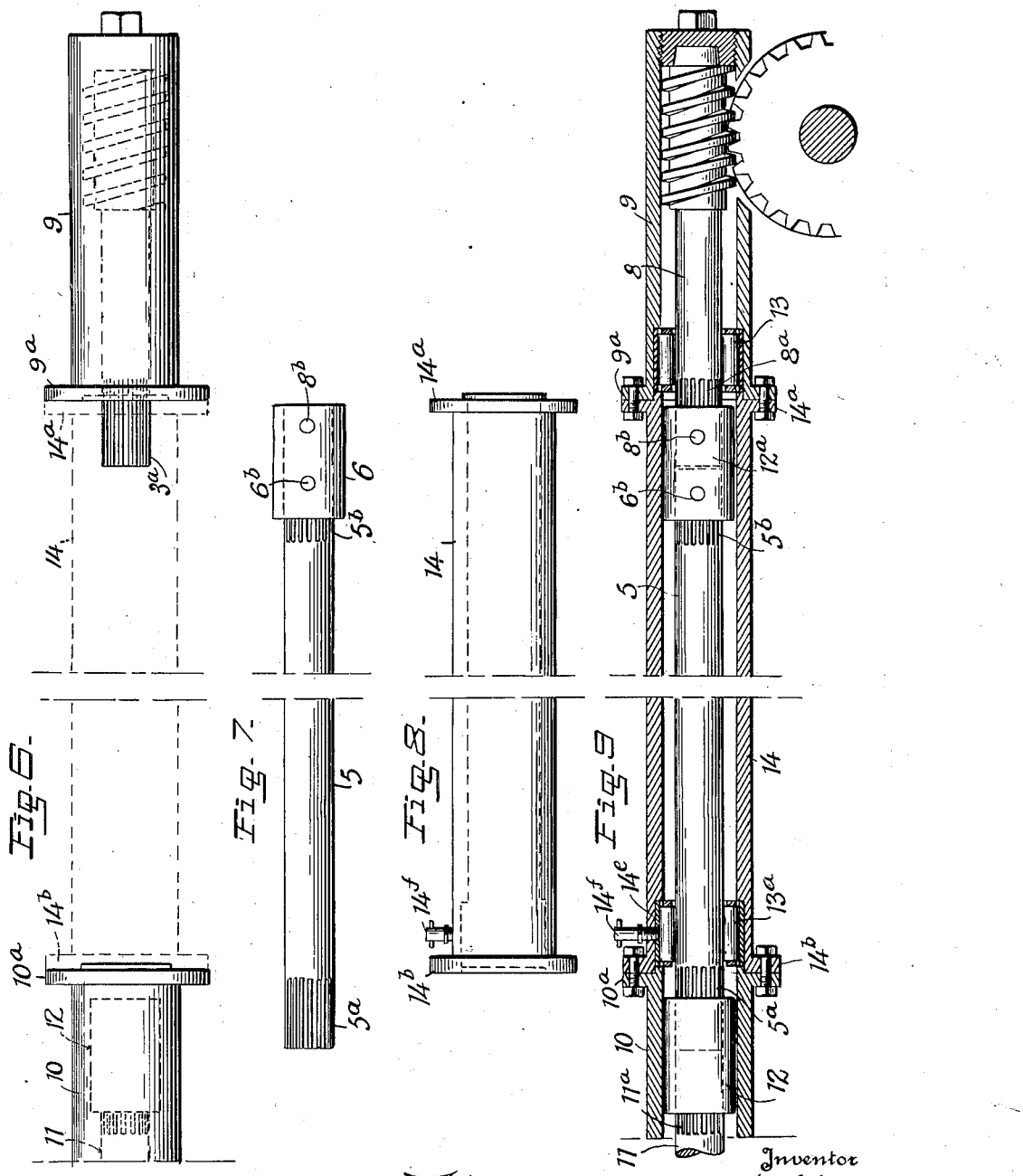

1,822,623

UNITED STATES PATENT OFFICE

MARION M. HILL, OF SIOUX FALLS, SOUTH DAKOTA, ASSIGNOR OF ONE-FOURTH TO MILES E. PECK AND LUCIUS J. WALL, BOTH OF SIOUX FALLS, SOUTH DAKOTA

DRIVE EXTENSION FOR TRUCKS

Application filed March 4, 1930. Serial No. 433,140.

This invention relates to automobile trucks, and its object is to provide simple and novel means whereby the drive shaft and torque tube or housing of an automobile truck drive can be extended simply, quickly and economically and retain all the parts of the original driving mechanism practically intact and arranged and operating in the extended driving mechanism as they did in the original truck drive.

The invention provides a novel extension drive shaft and torque tube or housing therefor and connections whereby the parts can be assembled with and between parts of the original drive mechanism, and when so assembled will constitute therewith a novel extended drive mechanism.

One object of the invention is to provide a drive extension which will employ only standard parts and will not necessitate altering the construction or method of operation or function of any of the parts in the original drive mechanism. Another object is to provide an extension drive mechanism which can be made more economically than other extension devices now on the market and which can be readily applied to the regular drive mechanism by an ordinary mechanic. A further object is to provide an extension mechanism which will not require any expensive special fittings or parts, nor any additional universal joints, gears or connections that consume power and are liable to wear; and which will weigh very much less in proportion to its length than other extensions now on the market.

In the accompanying drawings I have illustrated a practical embodiment of the invention as applied to the well known Chevrolet truck drive, and also as applied to the well known Ford truck drive and will explain the invention in detail with reference thereto to enable others to adopt and use the invention not only in connection with the particular machines referred to, but also on other types of truck drives to which the invention when understood can be readily applied.

In the claims following the description I have summarized the novel features of construction and novel combinations of parts for which protection is desired.

In said drawings:

Fig. 1 is a side view of the members of the usual drive connection between the universal-joint and drive shaft, and the bell housing and torque tube or drive shaft housing of a Chevrolet truck, said members being spaced apart the desired distance for the insertion therebetween of my novel drive shaft extension devices.

Fig. 2 is a side view of the extension shaft detached.

Fig. 3 is a side view of the extension torque tube or housing detached.

Fig. 4 is a longitudinal sectional view showing the extension shaft and extension housing inserted between and connected with the parts shown in Fig. 1 to form the desired extension of the drive mechanism.

Fig. 5 is a section on the line 5—5 Fig. 3.

Fig. 6 is a view similar to Fig. 1 showing the usually connected parts of a Ford truck drive mechanism spaced apart for the insertion of my extension devices.

Fig. 7 is a side view of the extension drive shaft for the Ford truck drive.

Fig. 8 is a view of the extension housing for the Ford truck drive.

Fig. 9 is a longitudinal sectional view of the drive extension assembled with the Ford parts as shown in Fig. 1, making a complete extension drive.

Referring to Figs. 1 to 4; 1 designates the universal joint housing of a Chevrolet motor truck drive, the bell member thereof having a sleeve 1b for the reception of the reduced end 2a of the ordinary torque tube of a Chevrolet truck; within which torque tube is the usual drive shaft 3. The forward end of shaft 3 ordinarily projects through and beyond the reduced end of the torque tube 2 and is splined as at 3a to engage the internally splined member 4a of a universal-joint 4 within the housing 1. Within the reduced end 2a of the torque tube 2 is a bearing 3b for the adjacent end of the shaft 3. The parts thus far described are or may be such as are commonly used in the Chevrolet truck and therefore need no further detailed description herein.

It is frequently desired to lengthen the truck chassis and this necessitates a corresponding extension of the driving mechanism. To extend the drive in accordance with my invention the torque tube 2 and shaft 3 are respectively disengaged from the universal joint member 4a and sleeve 1b and an extension shaft 5 of the desired length (Fig. 2) is inserted between the drive shaft 3 and the member 4a of the universal joint as shown in Fig. 4. To support the end of the torque tube 2 and maintain it in alinement with the casing sleeve 1b (with which it is ordinarily engaged) and to protect the extension shaft and the splined connections from dust, grit and weather, an extension housing 7 (see Fig. 3) is inserted between and connected with sleeve 1b and the torque tube 2 (see Fig. 4).

The extension shaft 5 (see Fig. 2) is preferably of the same diameter as the drive shaft 3 and of such length as is required for the extension. One end of this shaft is splined as at 5b and inserted into one end of an internally splined sleeve 6. The other end of said sleeve is internally splined to engage the splined end 3a of the drive shaft 3. The splined ends 3a and 5b are preferably alike so that either can be readily engaged with internal splines of the sleeve 6, which forms a firm and rigid connection between the extension shaft 5 and the drive shaft 3a when the parts are in operative position as shown in Fig. 4. The sleeve 6 may be secured to shafts 5 and 3 by screws or pins 6b and 6a so that there can be no relative longitudinal play between said shafts 3 and 5, which practically form one shaft when the parts are properly connected.

The other end 5a of shaft 5 is splined to correspond with the splined end 3a of shaft 3, and is adapted to be entered into the internally splined member 4a of the universal joint 4 within the housing 1, as shown in Fig. 4. The end 5a of the extension shaft 5 has the same relation to and connection with the member 4a that the end 3a of shaft 3 had in the original drive.

The extension housing 7 is preferably made of two partly telescoped tubes 7a and 7b. Tube 7a is of an external diameter preferably corresponding to the internal diameter of the universal joint casing sleeve 1b and tube 7b internally corresponds in diameter to the external diameter of the end 2a of the torque tube 2. The telescoped ends of tubes 7a and 7b are rigidly united preferably by electrically welding the same as indicated in Fig. 4. The extension housing 7 could be made of one integral tube having one end reduced, but can be made more cheaply by using two tubes of different diameters and welding them together.

The end 7b of the housing is adapted to be telescoped over and closely fitted onto the reduced end 2a of the torque tube as shown in Fig. 4; and the tube 7a preferably projects from the tube 7b a distance equal to the length of the reduced portion 2a of the torque tube 2, and is adapted to be entered into the sleeve 1b of the universal joint housing in the same manner that the reduced end 2a of the torque tube is ordinarily fitted therein.

After sleeve 6 has been engaged with the end 3a of shaft 3 and before its end 5a is engaged with the universal joint member 4a the extension housing 7 should be slipped over the shaft 5, onto the reduced end 2a of the torque tube 2, and should be rigidly fastened thereto by any suitable means. Preferably this end of the housing is split (see Fig. 5) and is provided on opposite sides of the split with depending lugs 7e which may be forcibly drawn together by bolts 7f and clamp the extension housing rigidly to the torque tube. The reduced end 7a of the housing has a sliding fit within the sleeve 1b (see Fig. 4) in the same manner and for the same purpose that the end 2a of the torque tube 2 was originally slidably fitted therein. The housing extension 7 may be provided with an oil or grease inlet valve 7° of any suitable construction for the admission of grease or oil as desired.

In order to properly center the end 5a of the extension shaft 5 in the end 7a of the extension housing a standard bearing 7d (corresponding to the bearing 3b in the torque tube) is inserted in the tube 7a in substantially the same relation to the splined end 5a of shaft 5 that bearing 3b has to the splined end 3a of shaft 3. The tube 7a is preferably bored out as indicated at 7i (as the end 2a of the torque 2 is bored out at 2i) so as to give clearance for the universal joint member 4a to enter and play therein as it originally did in the end of the torque tube.

The extension shaft 5 is connected with the usual universal joint of the Chevrolet truck in the same manner that the usual Chevrolet drive shaft 3 connects therewith, and no special parts are required, the connections being made just as readily as though the original drive shaft had been merely disconnected from the universal and then reconnected thereto.

It will be seen that none of the structural parts used in the original Chevrolet drive are changed or mutilated in any way, and they are all utilized for the same purpose and in the same manner as in the original drive. The original bearing 3b is not moved or injured and remains in its original position in the torque tube 2 when the extension shaft 5 is attached and connected with the universal joint. The recess 7i in the end 7a of the extension housing 7 is of the same length as the recess 2i in the torque tube 2, so that bearing 7d supports the shaft 5 in the same relation to its end 5a, as the bearing 3b supports the shaft 3 in relation to its splined end 3a. The end 7a of the extension housing 7 can slide back and forth in the sleeve 1b of the bell housing 1 to compensate for jumping of the wheels upon the road or other end play of the chassis.

The ordinary extension is about eighteen inches in length, and in such a length the extension drive shaft is practically encased in a stiff extension housing or extension torque tube that is of double thickness throughout much of its length. This makes a secure and rigid extension connection between the torque tube and universal joint casing free from whipping, springing, vibration, or lateral variation as the extension shaft 5 is kept in exact axial alinement with the driving shaft 3 and there is no undue wear on the bearings or driving shaft as would be the case if the extension drive was out of axial alinement with shaft 3.

In assembling the extension only standard factory equipment parts are employed including splined sleeves, bearings and standard steel mill casings, and I do not have to make any special castings or forgings for any part of the extension. The entire extension can be readily assembled and installed on any truck by an ordinary mechanic, and has been very thoroughly tested and practically and successfully used in many trucks.

Figures 6 to 9 illustrate a modification of the invention as applied to a "Ford" truck drive. The standard Ford trucks have a stud worm drive shaft 8 contained within a sleeve or tubular member 9 having a flange 9a on its front end which is bolted to a flange 10a on the adjacent end of the torque tube or housing 10 of the main drive shaft 11. Usually flange 10a is a male flange and flange 9a a female flange so that the two will be accurately fitted together, and can be secured by bolts transfixing the flanges. The shafts 8 and 11 have their adjacent ends splined, as indicated at 8a and 11a, and respectively entered into the internally splined ends of a sleeve 12 which is rotatably mounted within a housing 10 adjacent the flange 10a, the end 8a of shaft 8 projecting beyond the flange 9a and into the adjacent end of the sleeve 12 within the housing 10. Within the housing 9 adjacent the flange 9a is a standard Ford roller bearing 13 which supports and centers the stud shaft 8 within the sleeve 9.

In applying my extension to a Ford truck drive, an extension shaft 5 of whatever length desired is employed, such extension shaft being preferably of the same diameter as the stud shaft 8, and splined on its opposite ends like the spline 8a on the Ford stud shaft, and the spline 11a on the Ford drive shaft. Also an extension housing 14 for the extension shaft 5 is formed of a tube preferably of the same diameter as the Ford torque tube 10 and is similarly bored out at one end to receive a standard roller bearing 13a like bearing 13, and said extension housing is provided with flanges 14a 14b on its ends respectively adapted to engage the flanges 10a, 9a on the Ford torque tube 10 and sleeve 9.

In making an extension of a Ford truck drive by my invention, the flanges 9a and 10a are disengaged, and the sleeve 9 and worm shaft 8a, separated from the housing 10 and shaft 11 the distance desired for the extension, as indicated in Fig. 6, the end 8a of the worm shaft 8 projecting beyond the sleeve 9. Then an extension shaft 5 (as above described) of the desired length has its splined end 5a (corresponding to the splined end 8a of the worm shaft 8) engaged with the end of the sleeve 12 which was formerly engaged by the end 8a of shaft 8; and the splined end 5b of shaft 5 (which corresponds to the splined end 11a of shaft 11) engaged with one end of an internally splined sleeve 12a (which is a duplicate of sleeve 12) the other end of which engages the splined end 8a of the worm shaft 8. The sleeve 12a may be pinned to the shafts 5 and 8 if desired, as indicated at 6b—8b Fig. 9.

After the shaft 5 has been connected to worm shaft 8 as above described but before its end 5a is engaged with the sleeve 12, the extension housing 14 is slipped over shaft 5. The flanges 10a and 14b are bolted together after the end 5a of shaft 5 has been engaged with the adjacent end of sleeve 12. Before the extension housing 14 is fastened to housing 10 a roller bearing 13a similar to bearing 13 is inserted in the end of the extension housing 14 adjacent flange 14b. The bore in the end of housing 14 is enlarged as at 14e to accommodate the bearing 13a just as the bore in the end of sleeve 9 is enlarged to accommodate bearing 13. The housing 14 may be provided with an oil or grease inlet bore 14f.

The Ford extension is applied at the rear end of the vehicle and not connected to the universal joint as in the Chevrolet extension, because the bell housing and torque tube in a Ford car are all cast in one piece and are not detachable at the universal joint end. It is also logical to place the extension at the rear of the torque tube of the Ford because the worm shaft and sleeve thereat are parts of the factory equipment of the Ford truck. The extension is simple, compact and light, and provides a practically continuous drive shaft extending from the universal joint to the rear axle; and without requiring any extra cross members extra supports of any nature for the extension or any additional universal joints or other connections.

In addition to light weight and small cost of my drive extension, it has other advantages, such as the elimination of extra gears, joints and additional supports, hangers, braces, or other means for attaching the extension to the chassis such as are usually employed in other extensions.

My invention provides a drive shaft extension transmitting power directly from the motor to the rear or axle end of the vehicle a direct line, and no power is wasted in operating additional gears or joints as the lengthening of the drive shaft lessens the strain upon and loss of power absorbed by the universal joint; and the extension drive shaft is aided and strengthened by the additional bearing in the extension housing. The extension drive can be made of any length from a few inches to several feet as desired. There is no mutilation of the original truck drive equipment, and standard factory parts can be used in the extension, which is simple and easy to install and if repairs are necessary these can be made with a minimum amount of disassembling.

I claim:

1. In combination with the drive of a motor vehicle including a driving and a driven member adapted to be engaged in the normal drive, and a torque tube and sleeve also adapted to be coupled by standard connections in the normal drive and to enclose the connection between said driving and driven members; of an extension shaft adapted to be inserted between said driving and driven members having one end corresponding to the end of the driven member and adapted to similarly engage the driving member, and its other end corresponding to the driving member and adapted to similarly engage the driven member; and an extension housing enclosing the extension shaft and having one end corresponding to the standard end of the sleeve and adapted to similarly engage the end of the torque tube, and its other end corresponding to the standard end of the torque tube and adapted to similarly engage the sleeve; whereby the drive may be extended and the extension drive shaft and extension housing supported by standard connections by and between the original torque tube and sleeve said housing maintaining rigid alinement of the driven and driving members and extension shaft.

2. In combination with the drive of a motor vehicle including a driving and a driven member adapted to be engaged in the normal drive, and a torque tube and sleeve also adapted to be coupled by standard connections in the normal drive and to enclose the connection between said driving and driven members, said driving and driven members and said torque tube and sleeve being adapted to be disengaged and separated without otherwise destroying their relation in the drive; of an extension shaft adapted to be inserted between said driving and driven members and having one end corresponding to the end of the driven member and adapted to similarly engage the driving member, and its other end corresponding to the driving member, and adapted to similarly engage the driven member; and an extension housing enclosing the extension shaft and having one end corresponding to the standard end of the sleeve and adapted to similarly engage the end of the torque tube, and its other end corresponding to the standard end of the torque tube and adapted to similarly engage the sleeve; whereby the drive may be extended and the extension drive shaft and extension housing supported by standard connections by and between the original torque tube and sleeve while maintaining rigid alinement of the driven and driving members and extension shaft.

3. In combination with the driving mechanism of a motor vehicle including a driving and a driven member adapted to be engaged in the normal drive, and a torque tube and sleeve also adapted to be engaged in the normal drive and to enclose the connection between said driving and driven members, said driving and driven members and said torque tube and sleeve being adapted to be disengaged and separated without otherwise destroying their relation in the drive; of an extension shaft adapted to be inserted between said driving and driven members and having one end corresponding to the end of the driven member and adapted to similarly engage the driving member and its other end corresponding to the driving member and adapted to similarly engage the driven member; and an extension housing enclosing the extension shaft composed of telescoped tubes one end corresponding to the end of the sleeve and adapted to similarly engage the end of the torque tube, and the other end of the housing corresponding to the end of the torque tube and adapted to similarly engage the sleeve; the extension housing maintaining rigid alinement of the driven and driving members and extension shaft.

4. In combination with the driving mechanism of a motor vehicle including a driving and a driven member adapted to be engaged in the normal drive, and a torque tube and sleeve also adapted to be engaged in the normal drive and to enclose the connection between said driving and driven members; said driving and driven members and said torque tube and sleeve being adapted to be disengaged and separated without otherwise destroying their relation in the drive; of an extension shaft adapted to be inserted between said driving and driven members and having one end corresponding to the end of the driven member and adapted to similarly engage the driving member and its other end corresponding to the driving member and adapted to similarly engage the driven member; and an extension housing enclosing the extension shaft composed of telescoped tubes one end corresponding to the end of the sleeve and adapted to similarly engage the end of the torque tube the said end of the extension housing being split and provided with clamping means, and the other end of the housing corresponding to the end of the torque tube and adapted to similarly engage the sleeve; the extension drive shaft and extension housing being supported in place solely by and between the original torque tube and sleeve and the extension housing maintaining rigid alinement of the driven and driving members and extension shaft.

MARION M. HILL.